United States Patent [19]

Schott et al.

[11] Patent Number: 5,605,026

[45] Date of Patent: Feb. 25, 1997

[54] ULTRASONIC CARTON SEALER

[75] Inventors: Erik Schott, Buffalo Grove; Hisami Mitsuishi, Wheeling; Par Svensson, Palatine; Stefan Annehed, Palatine; Dean Skonieczny, Palatine, all of Ill.; Olof Stark, Ystad; Gunnar Drevfors, Akarp, both of Sweden

[73] Assignee: Tetra Laval Holdings & Finance S.A., Pully, Switzerland

[21] Appl. No.: 315,412

[22] Filed: Sep. 28, 1994

Related U.S. Application Data

[63] Continuation-in-part of Ser. No. 190,546, Feb. 2, 1994, Pat. No. 5,488,812.

[51] Int. Cl.$^6$ .............................. B65B 7/20; B65B 51/10
[52] U.S. Cl. ................... 53/373.7; 53/DIG. 2; 53/374.2; 53/371.2; 156/580.2
[58] Field of Search .................................. 53/477, 374.2, 53/371.2, 373.7, DIG. 2; 156/580.2, 580.1; 269/101

[56] References Cited

U.S. PATENT DOCUMENTS

| | | |
|---|---|---|
| 2,495,065 | 1/1950 | Hull . |
| 3,294,616 | 12/1966 | Linsley et al. .......................... 53/373.7 |
| 3,649,421 | 3/1972 | Berleyoung . |
| 3,661,661 | 5/1972 | Berleyoung . |
| 3,947,307 | 3/1976 | Buschscheidt . |
| 3,996,724 | 12/1976 | Smith ................... 53/DIG. 2 |
| 4,145,236 | 3/1979 | Neumayer et al. ................... 53/DIG. 2 |
| 4,193,833 | 3/1980 | Young . |
| 4,241,560 | 12/1980 | Deimel et al. ....................... 53/DIG. 2 |
| 4,251,303 | 2/1981 | Deimel et al. . |
| 4,357,186 | 11/1982 | Calvert ................. 156/580.1 |
| 4,401,501 | 8/1983 | Stumpf . |
| 4,444,614 | 4/1984 | Krayer . |
| 4,581,873 | 4/1986 | Knuppertz et al. ................... 156/580.2 |
| 4,647,325 | 3/1987 | Bach . |
| 5,085,029 | 2/1992 | Esper . |

*Primary Examiner*—John Sipos
*Assistant Examiner*—Rodney A. Butler
*Attorney, Agent, or Firm*—McAndrews, Held & Malloy, Ltd.; Patrick N. Burkhart

[57] ABSTRACT

Ultrasonic sealing apparatus, including at least one anvil and at least one transducer opposed to the anvil to transmit ultrasonic energy to a workpiece clamped between them, is disclosed. The anvil and sealing horn each are reciprocated between an open position allowing a carton to pass and a closed position for sealing a closure. A biasing element is connected between the anvil or the horn and its drive to define the sealing pressure developed between the anvil and the horn. The biasing force can be adjusted without stopping the machine, by using an externally applied pneumatic force. The anvil has a backing element, a facing member, a body, and a resilient pad separating the body from the facing member. The backing element has a curved front surface facing the transducer. The back surface of the anvil pad is curved similarly to and bears against the curved front surface of the backing element. A fastener is provided for selectively fixing the anvil pad and the backing element together or allowing the anvil pad to shift along the curved surface of the backing element for aligning the anvil with respect to the transducer. The apparatus may also include cooling fluid passages within the facing member and extending through the anvil body and the resilient pad for carrying fluid from the source of cooling fluid through the facing member of the anvil. A method for aligning the anvils and transducers of a ultrasonic sealing apparatus as described above is also disclosed.

34 Claims, 17 Drawing Sheets

TOP SEAL CAM POSITION PROFILE

BOTTOM SEALER CAM POSITION PROFILE

ULTRASONIC CARTON SEALER

CROSS-REFERENCE TO RELATED APPLICATIONS

This application is a continuation-in-part of U.S. Ser. No. 08/190,546, filed Feb. 2, 1994 now U.S. Pat. No. 5,488,812.

TECHNICAL FIELD

The present invention relates generally to clamps for gripping workpieces, and particularly to such clamps configured as ultrasonic sealers for gripping a gable or similar closure between an ultrasonic transducer and an anvil, thus sealing the closure. The invention relates more particularly to alignment mechanisms and cooling apparatus for the anvil assemblies of such machines, and to the supporting elements and drives for jaw-like sealing elements which clamp, heat or otherwise energize, and then release a closure to seal it.

BACKGROUND

Gable-top containers or containers are used widely for packaging milk, juices, and other foods, as well as a variety of other products. Such containers are made from sheet material which is heat-sealable to itself. The typical material is paper board coated on both sides with polyethylene or another heat-sealable material. The construction and parts of such containers and the blanks from which they are formed are described and illustrated, for example, in U.S. Pat. No. 4,744,467, issued to Tetra Pak International AB, and U.S. Pat. No. 4,775,096, issued to AB Tetra Pak. Those entire patents are incorporated by reference here.

Gable closures are conventionally sealed by folding the carton along preformed score lines to form an upstanding fin (or, for a bottom closure, a depending fin) having several thicknesses of heat sealable material. The fin is captured between an ultrasonic sealing horn and an anvil, and ultrasonic energy transducer to the joint through the horn causes the heat-sealable material in the fin to fuse, forming a seal.

One problem which such sealing apparatus must overcome is the difficulty of reliably applying a uniform sealing pressure, accurately located on the closure surfaces. This problem is particularly felt when the sealing apparatus has multiple, commonly driven ultrasonic horns and anvils for simultaneously sealing a corresponding number of cartons in one sealing stroke. Misalignment or other maladjustment of a single sealing horn or its corresponding anvil can result in an unacceptable carton reject rate or bring into question the integrity of the seals of products released for sale.

The anvil opposing a single ultrasonic transducer has previously been proposed to be mounted on a ball joint, so the anvil will self-adjust into parallelism with the face of the ultrasonic energy transducer when work is clamped between the anvil and transducer. This arrangement is shown in U.S. Pat. No. 3,661,661.

Another problem which carton sealing apparatus must address is the need to adjust the sealing pressure exerted by the apparatus, either when the machine is being reconfigured to seal a different type of package or to fine-tune the machine during a product run.

Yet another problem is how to provide a compact sealing station, particularly if both the anvils and the sealing horns are driven, and thus require separate drives. An independent drive on each side of the sealing station makes the machine wider than a machine in which only the horns or only the anvils are driven.

An aggravating problem is that, when foods or other products which must remain clean are packaged, the drives must be isolated from the hygienic area to which the food is exposed during packaging. If separate drives for the horns and anvils are located on both sides of the sealing area, both drives must be isolated from the sealing area. The same barriers which maintain hygienic conditions make it difficult to monitor the cartons being sealed. Interconnected drives for both the horns and the anvils are sometimes difficult to isolate from the hygienic area where food is sealed.

Yet another problem which must commonly be addressed when ultrasonic sealing equipment is designed is how to prevent the intentionally separate moving parts of the equipment from being welded together, should they come into contact accidentally or intentionally during a sealing operation. Another problem is how to prevent the auxiliary equipment associated with ultrasonic sealing apparatus, such as cooling apparatus, from vibrating itself apart or otherwise being damaged by stray ultrasonic vibrations transmitted within the machinery.

The anvils for ultrasonic sealing apparatus have also previously been provided with cooling apparatus for removing heat transmitted during the sealing operation.

SUMMARY OF THE INVENTION

The present machine is a carton sealer for sealing a closure having first and second sides and disposed at a closure sealing position. A typical closure which can be sealed by the present machine is a gable top or bottom closure for a food carton. The sealer includes an anvil, an ultrasonic sealing horn, an anvil drive, a horn drive, and a biasing element.

The anvil is mounted for travelling back and forth between an open position allowing a carton to pass and a closed position for bearing against the first side of a closure located at the closure sealing position. An anvil drive is provided for moving the anvil back and forth between its open position and its closed position.

The ultrasonic sealing horn is also mounted for travelling back and forth between an open position allowing a carton to pass and a closed position for bearing against the second side of a closure located at the closure sealing position. A horn drive is provided for moving the horn back and forth between its open position and its closed position.

One feature of the present machine is thus that both the anvil and the sealing horn are movable so that a closure located in the center of a carton can be engaged without making any provision to move the carton laterally.

A biasing element—which can be thought of as a cushion or spring—is connected between either the anvil or the horn and its drive (or between each of those elements and its drive, in an alternate embodiment). The biasing element limits the sealing pressure developed between the anvil and the horn to a predetermined maximum value. The predetermined value is the pressure exerted by the biasing element. This prevents the anvil and horn from gripping the closure too tightly and thus either damaging the closure or the sealing machine, and compensates for slight inaccuracies in position of the anvil or horn without increasing or decreasing the sealing force. The biasing force can also be adjusted externally, without stopping the machine, by using an externally applied pneumatic force as the biasing element.

An ultrasonic sealing apparatus is claimed including at least one anvil and at least one transducer opposed to the anvil to transmit ultrasonic energy to a workpiece clamped between them.

The anvil has a backing element supporting a pad. The backing element is adapted to move generally along an axis between an open and a closed position relative to the transducer. The backing dement has a curved front surface opposed to the transducer and defining an arc of a circle having a center and lying generally in a plane defined by the axis.

The anvil pad has a front surface and a back surface. The front surface contacts a workpiece (such as the closure of a carton requiting sealing). The back surface of the anvil pad is curved similarly about the same center as the curved front surface of the backing element. The anvil back surface normally bears against the curved front surface of the backing element.

A fastener is provided having a securing position for fixing the anvil pad and the backing element together and an adjusting position for allowing the anvil pad to rotate about the center relative to the backing element for aligning the anvil with respect to the transducer.

Another aspect of what is claimed is an ultrasonic sealing apparatus including a source of cooling fluid, an anvil, and a transducer opposed to the anvil. The anvil includes a facing member, a body, and a resilient pad separating the body from the facing member. A first passage is formed within the facing member for carrying a cooling fluid through the facing member. A second passage extends through the anvil body and the resilient pad for carrying fluid from the source of cooling fluid to the first passage in the anvil.

Still another aspect of what is claimed is a clamp comprising a pair of opposed first and second jaws for gripping a workpiece. The first jaw includes a backing element and a jaw pad joined by a fastener.

The backing element of the first jaw is supported and driven so it will move back and forth along an axis between an Open and a closed position relative to the second jaw. The backing element has a curved front surface opposed to the second jaw and defining an arc of a circle having a center and lying generally in a plane passing through the axis.

The jaw pad of the first jaw has a front surface for contacting a workpiece, such as the closure of a carton requiring sealing. The jaw pad also has a curved back surface which is curved similarly to and normally bears against the curved front surface of the backing element.

The fastener has a securing position for fixing the jaw pad and the backing element together and an adjusting position for allowing the jaw pad to rotate about the center relative to the backing element for aligning the first jaw with respect to the second jaw.

Still another aspect what is claimed is a method for aligning the anvils and transducers of a ultrasonic sealing apparatus which has more than one anvil and transducer of the type first described above. The fasteners securing the anvils to a common backing element are loosened to their adjusting positions, so the anvils are free to move. The anvils are then advanced against the transducers. The clamping force between the anvils and transducers shifts any of the anvil pads which are out of alignment into proper alignment about their centers described above. The fasteners are then tightened to fix the anvils on the backing element, maintaining their alignment. Alternatively, the transducers could be supported by a common backing element and could be adjustable, instead of the anvils, within the scope of what is claimed.

DETAILED DESCRIPTION OF THE PREFERRED EMBODIMENT

While the one or more preferred embodiments will be described, it will be understood that the claims are not limited to those embodiments. On the contrary, the claims shall be interpreted to include all alternatives, modifications, and equivalents within their spirit and scope.

Figure 1:
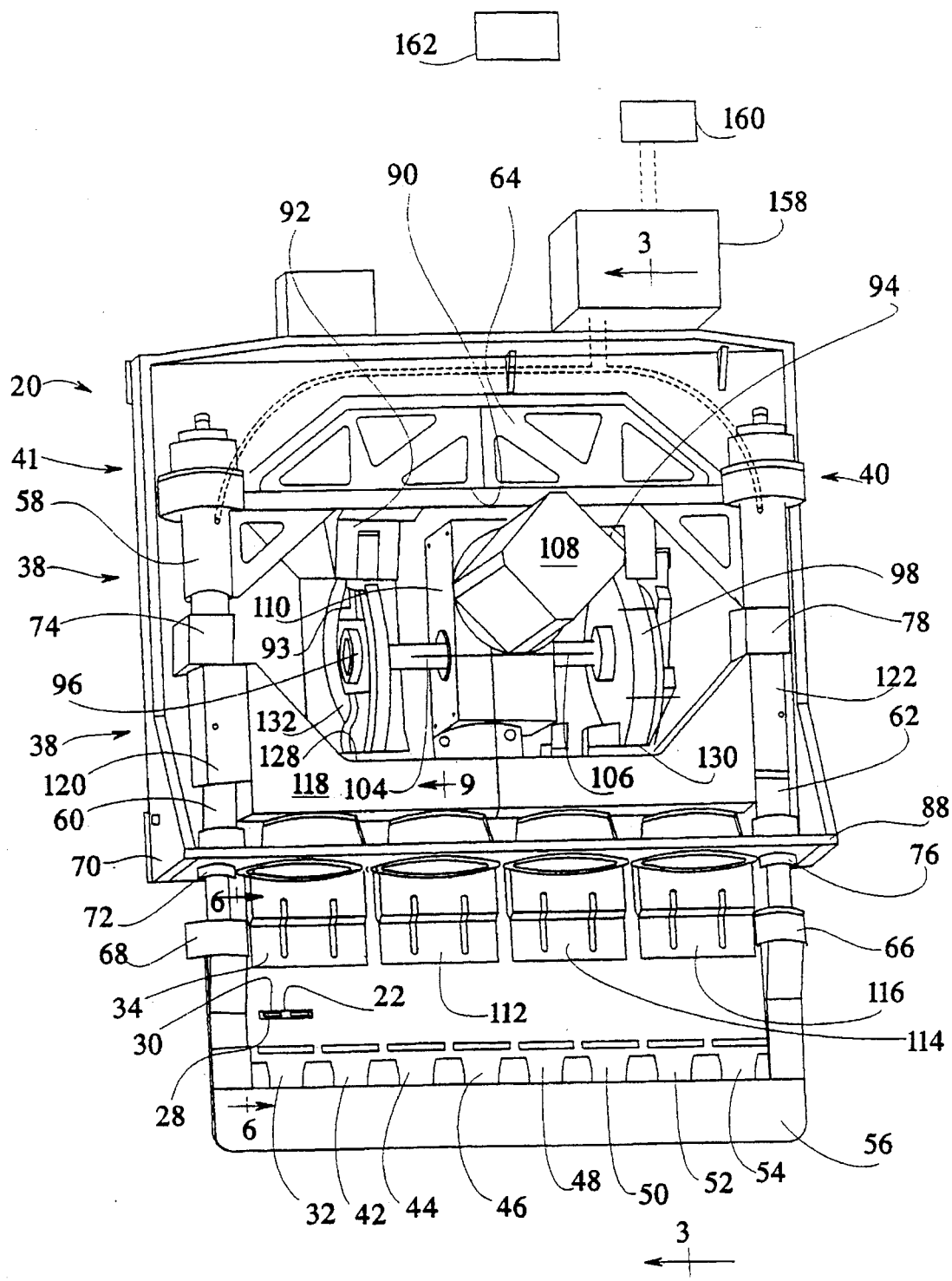
FIG. 1 is a perspective view of a carton sealing machine.

Referring first to FIG. 1, the carton sealer generally indicated at 20 is a module of a carton filling and sealing machine such as the one described in U.S. Ser. No. 08/190, 546, filed Feb. 2, 1994, which is hereby incorporated by reference (the other parts of which are not shown). A filling and sealing machine of this kind includes two such modules, one for sealing the bottom fin 22 (shown in FIG. 2) of each carton such as 24 before it is filled, and the other for sealing the top fin of the carton 24 (which will be located at the fold line 26 shown in FIG. 2 after the top closure is folded shut). The top fin 26 is sealed after the carton is filled.

Each closure 22, 26 of the carton 24 has a first side 28 which faces the anvils such as 32 and a second side 30 which faces the ultrasonic sealing horns such as 34 when the carton 24, and more particularly a closure such as 22 of the carton 24, is located at a closure sealing position. A typical closure which can be sealed according to the present machine is a gable top or bottom closure for a food carton.

Figure 2:
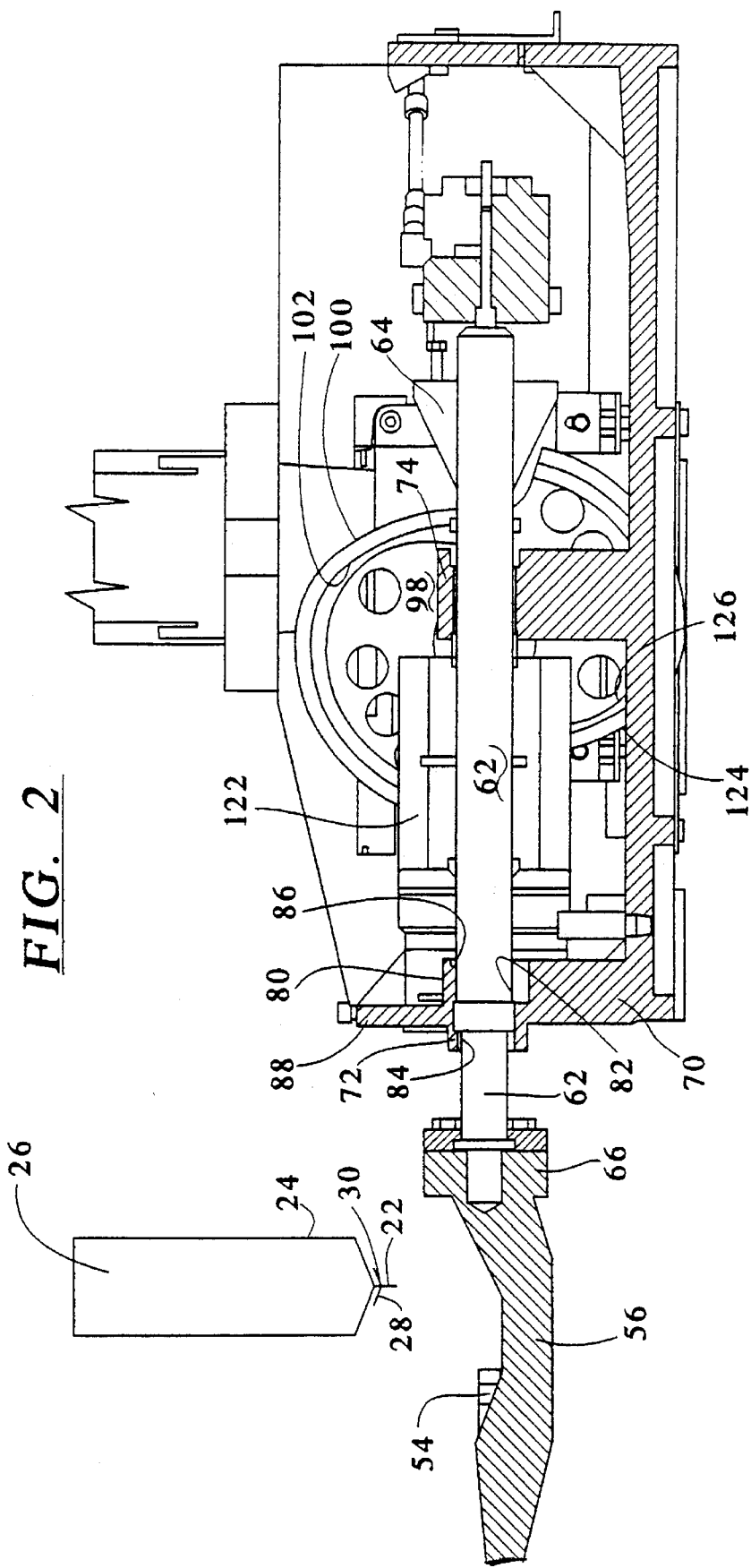
FIG. 2 is a side elevational view of the machine of FIG. 1, with some portions shown in section and other portions removed.
Figure 8:
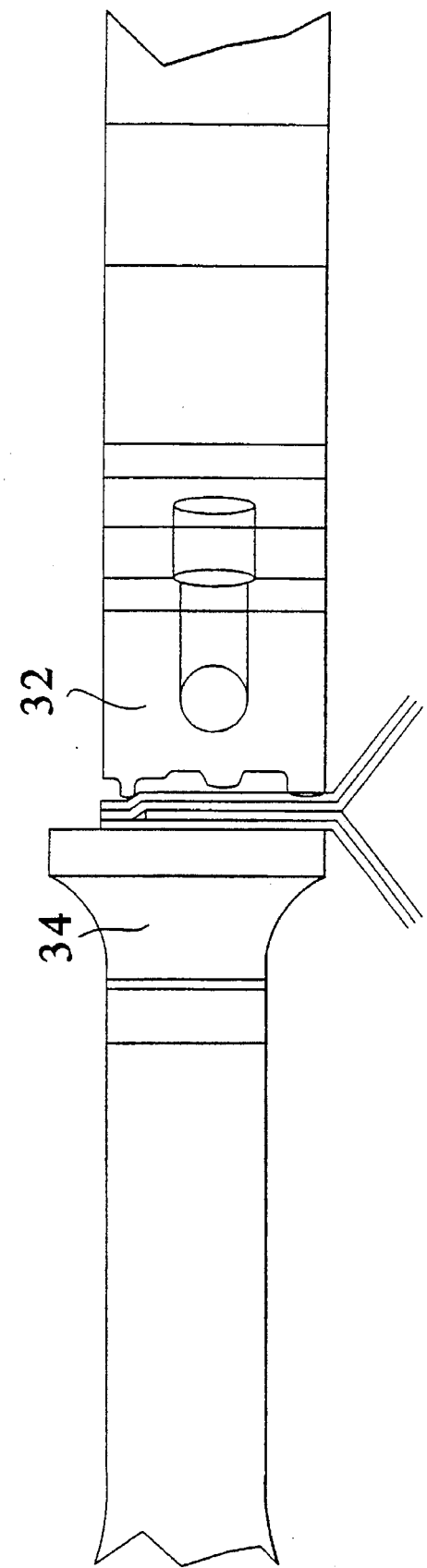
FIG. 8 is a view similar to FIG. 7, showing the anvil and sealing horn in their respectively closed positions, beating against the gable closure.

Referring briefly to FIG. 2, the carton 24 is sealed according to the following sequence. First, the carton 20, which previously has been folded to substantially its final configuration by apparatus which is not illustrated here, is advanced, translating its bottom fin 22 from a position at which it is free of the carton sealer 20 to the closure sealing position. The bottom fin is then sealed by closing the anvil 32 and sealing horn 34 substantially together to clamp the closure 22, as also illustrated in FIG. 8. The sealing horn heats up the bottom fin 22, fusing its heat-sealable elements together. The closure 22 is then unclamped. After the anvil 32 and sealing horn 34 are parted, the bottom fin 22 is translated in the reverse direction to disengage the carton 24 from the carton sealer 20, allowing the carton 24 to be advanced to the filler (not shown).

MAJOR SEALER ELEMENTS

Now returning to FIG. 1, the sealer 20 which is one embodiment of the present machine, includes an anvil 32, an ultrasonic sealing horn 34, an anvil drive generally indicated at 36, a horn drive generally indicated at 38, and biasing elements 40 and 41.

ANVIL ASSEMBLY

In the illustrated embodiment, a series of eight anvils: 32 and 42–54—are provided, so eight cartons can be sealed at the same time with a single reciprocal stroke of the ganged anvils. The eight anvils 32 and 42–54 are mounted on an anvil bar 56. The anvil bar 56 is arranged for travelling back and forth reciprocally, reciprocating each anvil such as 32 back and forth between an open position (best shown in FIGS. 1 and 7) allowing a carton to pass and a closed position (best shown in FIG. 8) for bearing against the first side 28 of a closure (such as the bottom fin 22) located at the closure sealing position.

A rectangular anvil frame 58 is defined by the anvil bar 56, the pull rods 60 and 62, and a pull bar 64. The pull rods 60 and 62 are rigidly bolted to the feet 66 and 68 of the anvil bar 56. The details of the fastening in this embodiment are best seen in FIG. 2. The pull rods 60 and 62 are operatively connected to the pull bar 64 by the biasing elements 40 and 41. The details of that connection are provided below.

The pull rod 60 is supported for reciprocal travel with respect to the frame 70 of the carton sealer 20 by slide bearings 72 and 74 (which are prominent in FIG. 2), while the pull rod 62 is supported for reciprocal travel with respect to the frame 70 of the carton sealer 20 by slide beatings 76 and 78.

Referring to FIGS. 1 and 2, the slide bearings 72 and 76 can be identical. Each is defined by a bushing such as 80 which is integral with the frame 70 and has a generally cylindrical bore 82 capped at its respective ends by retaining rings 84 and 86. A slide ring 84 is fixed to the associated pull rod such as 62 and slidable between limits defined by the retaining rings 84 and 86 within the bore 82.

The retaining tings 84 and 86 of this embodiment are also wiping seals which help isolate the non-hygienic area generally to the right (in FIG. 2) of the isolation wall 88, where the drive machinery is located, from the hygienic area generally to the left of the isolation wall 88 where cartons are being filled and packaged. This expedient is desirable because the pull rods 60 and 62 reciprocate through the bushing 80. By providing seals on each end of the bore 82, successive reciprocations of the pull rods will not tend to advance lubricants or other foreign matter into or through the bores such as 82 from right to left (as shown in FIG. 2). It is also important to prevent foreign matter, such as spilled food or carton debris, from advancing from left to right, as shown in FIG. 2 into or through the bores such as 82. That goal is also accomplished by the illustrated embodiment.

In this embodiment, the slide bearings 74 and 78 are located entirely within the non-hygienic area to the right of the isolation wall 88 of FIG. 2, and a second pair of retaining rings like 84 and 86 would be redundant. Thus, ordinary slide bearings 74 and 78 which lack wiping seals will suffice to keep the travel of the pull rods 60 and 62 accurately axial along the axes of the pull rods.

ANVIL DRIVE

An anvil drive generally indicated at 36 is provided for moving the pull bar 154, and thus the anvil bar 56 and the attached anvils 32 and 42–54, back and forth between their respective open and closed positions.

The drive for advancing the anvils 32 and 42–54 to their closed positions acts on a generally horn-facing side of the anvil frame 58, and in this embodiment specifically acts on the horn-facing side 90 of the pull bar 154. The horn-facing side of the pull bar 64 has advancing cam followers, here rollers 92 and 93, and retracting cam followers, here rollers 94 and 95 (95 is shown mostly in phantom in FIG. 3) attached to it, which are driven by cams 96 and 98. Since the two cam drives are identical, only one will be described in detail. The cam 98 has an anvil-advancing surface 100 for moving the anvils toward their closed position and an anvil-retracting surface 102, best seen in FIGS. 2 and 3, for moving the anvils toward their open position.

The cams 96 and 98 are respectively rotatably mounted on pivots. Here, the cam shafts 104 and 106 (which alternately can be the respective ends of a single shaft) carried in rotation bearings (not shown) define those pivots. The cam shafts 104 and 106 are driven by a servo motor 108 via a gear train located within the gear box 110 for rotating the cams 96 and 98 about their pivots. The servo motor or the gear train can be used to vary the cam rotation rate at various points in its travel, relative to the cam surface profile, so the amount of torque required of the servo motor does not exceed its capacity, particularly where the change in cam radius is steep. The sealing profile of cam position, velocity, and acceleration can also be changed remotely as desired by changing the position, velocity, and acceleration profile of the servo motor. Typical profiles are discussed below in connection with FIGS. 12–17.

Figure 3:
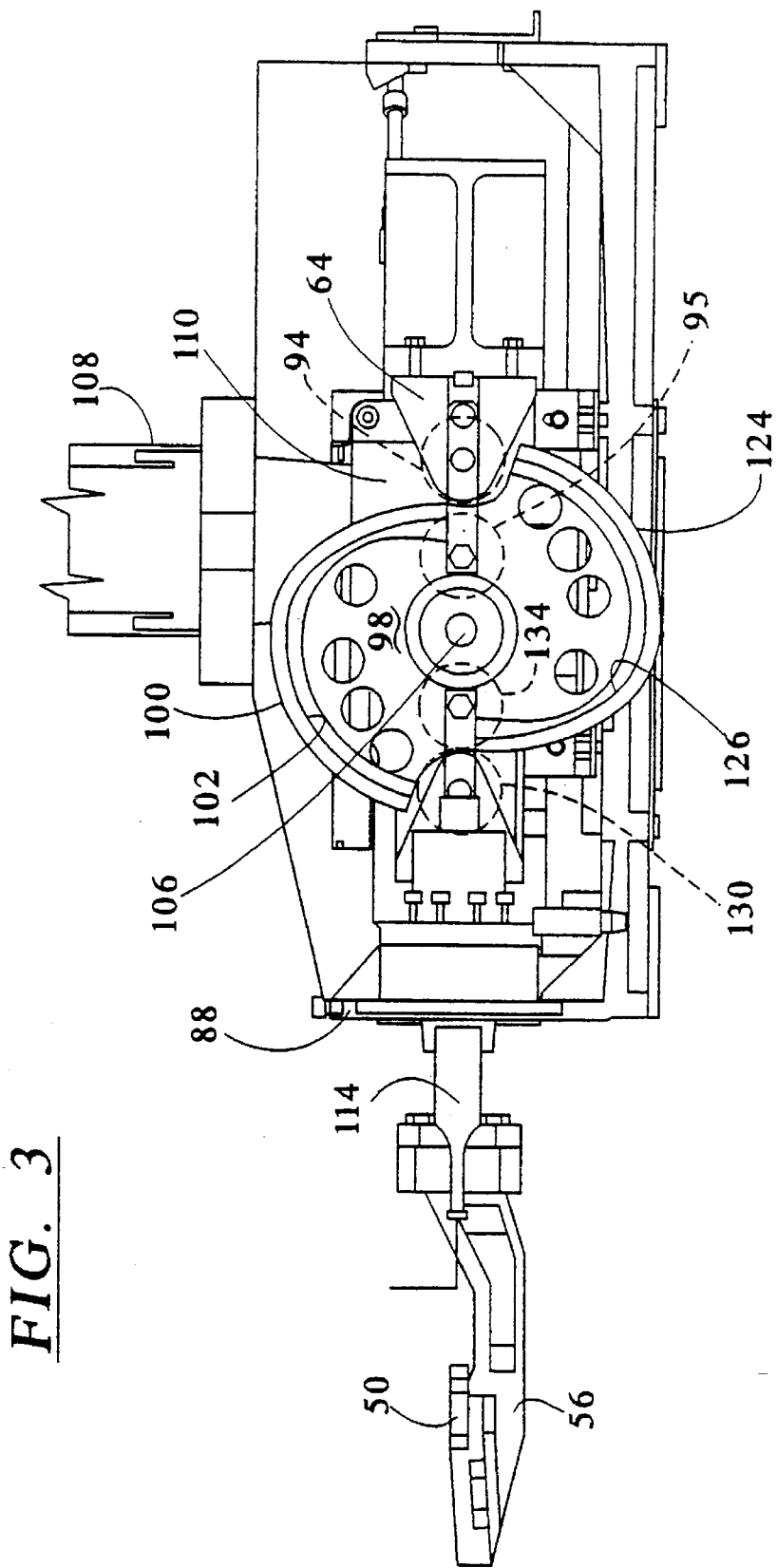
FIG. 3 is a side elevation taken from line 3—3 of FIG. 1, with overlying structure removed for clarity.

The cam 98 shown in FIGS. 2 and 3 is at its starting position at which the anvils 32 and 42–56 are in their fully open positions. The cam 98 is first driven clockwise about 160 degrees by the servo motor 108, so the radius of the portion of the cam surface 100 bearing upon the cam follower 94 generally increases. Referring to FIG. 1, that motion of the cam 98 pushes the cam follower 94, and thus the pull bar 64, the pull rods 60 and 62, and the anvil bar 56, upward toward their respective closed positions.

Then, when a seal is completed and the anvils 32 and 42–54 are to be retracted to their open position, the cam 98 is driven counterclockwise to its starting position. The anvil retracting surface 102 of the cam 98 bears against the cam follower 95, with the radius of the portion of the cam surface 102 contacted by the cam follower 95 generally decreasing. This counter-rotation of the cam 98 pulls the pull bar 64, the pull rods 60 and 62, and the anvil bar 56 downward (as shown in FIG. 1) toward their open positions.

ULTRASONIC HORN ASSEMBLY

In the illustrated embodiment, a series of four ultrasonic sealing horns or transducers—34 and 112–116—are provided, each wide enough to bear against two anvils, so eight cartons can be sealed at the same time with a single reciprocal stroke of the ganged sealing horns. The four sealing horns 34 and 112–114 are mounted on a cradle 118.

The cradle 118 is arranged for travelling back and forth reciprocally between an open position (best shown in FIGS. 1 and 7) allowing a carton to pass and a closed position (best shown in FIG. 8) for bearing against the second side 30 of a closure (such as the bottom fin 22) located at the closure sealing position.

The cradle 118 has integral bushings 120 and 122 slidably received on the pull rods 60 and 62, defining slide bearings. This arrangement accurately locates the sealing horns and anvils relative to each other as they reciprocate. The ultrasonic stacks which terminate in the sealing horns 34, 112, 114, and 116 also include ultrasonic converters or transducers and ultrasonic generators, which are not shown. The ultrasonic stacks are mounted on the cradle 118 to locate, support, and drive them.

ULTRASONIC HORN DRIVE

A cam-operated horn drive generally indicated at 38 is provided for moving the cradle 118 back and forth between its open position and its closed position. The cams 96 and 98 each have a horn-driving cam surface, such as the surface 124 shown in FIG. 2, and a horn-retracting cam surface, such as the surface 126 shown in FIG. 2. These cam surfaces are substantially opposed to, but approximately the same shape as, the anvil-driving and retracting surfaces, so the anvils and sealing horns move in opposition when the cams are rotated.

The cams 96 and 98 respectively drive cam followers 128 and 130, which are attached to the cradle 118 and follow the horn driving outer surfaces 124 of the cams 96 and 98. Thus, clockwise rotation of the cams 96 and 98 as described before generally increases the radius tracked by the cam followers 128 and 130, driving the cradle 118 and sealing horns 34 and 112–116 downward (as shown in FIG. 1) toward their closed position.

The cams 96 and 98 respectively drive cam followers 132 and 134, which are attached to the cradle 118 and follow the horn-retracting inner surfaces 126 of the cams. Thus, counterclockwise rotation of the cams 96 and 98 as described before generally decreases the radius tracked by the cam followers 132 and 134, driving the cradle 118 and sealing horns 34 and 112–116 upward (as shown in FIG. 1) toward their open position.

One feature of the present machine is thus that both the anvil and the sealing horn are movable in coordination by the same cams, thus using the same acceleration, velocity, and position profiles, so that a closure located in the center of a carton can be engaged without moving the carton laterally. Neither the sealing horn nor the anvil will arrive early or late, as the two are driven in cooperation. Thus, the carton can be securely supported in such a manner that it is not movable laterally, as the carton position does not need to be adjusted to account for shifts in the closed position of the horns and anvils.

Another advantage of the illustrated arrangement is that the anvil drive and the horn drive are located on the same side of the sealing area, instead of on opposite sides. Thus, an isolation wall 88 is needed only on one side of the sealing area, so the sealing operation can readily be inspected from that side of the machine, while the operation of the non-hygienic part of the machine can be observed from the other side of the single isolation wall. The sealing apparatus, being all located in one area and employing multifunctional cams, also has a minimum width, which is desirable to minimize the width of the sealing line.

BIASING ELEMENT

The biasing element 40—which can be thought of as a cushion or spring—is connected between either the anvil or the horn and its drive (or between each of those elements and its drive, in an alternate embodiment). The biasing element limits the sealing pressure developed between the anvil and the horn to a predetermined maximum value. The predetermined value is the pressure exerted by the biasing element. This prevents the anvil and horn from gripping the closure too tightly and thus either damaging the closure or the sealing machine, and compensates for slight inaccuracies in position of the anvil or horn without increasing or decreasing the sealing force. The biasing force can also be adjusted remotely, without stopping the machine, by using an externally applied pneumatic force as the biasing element.

Figure 4:
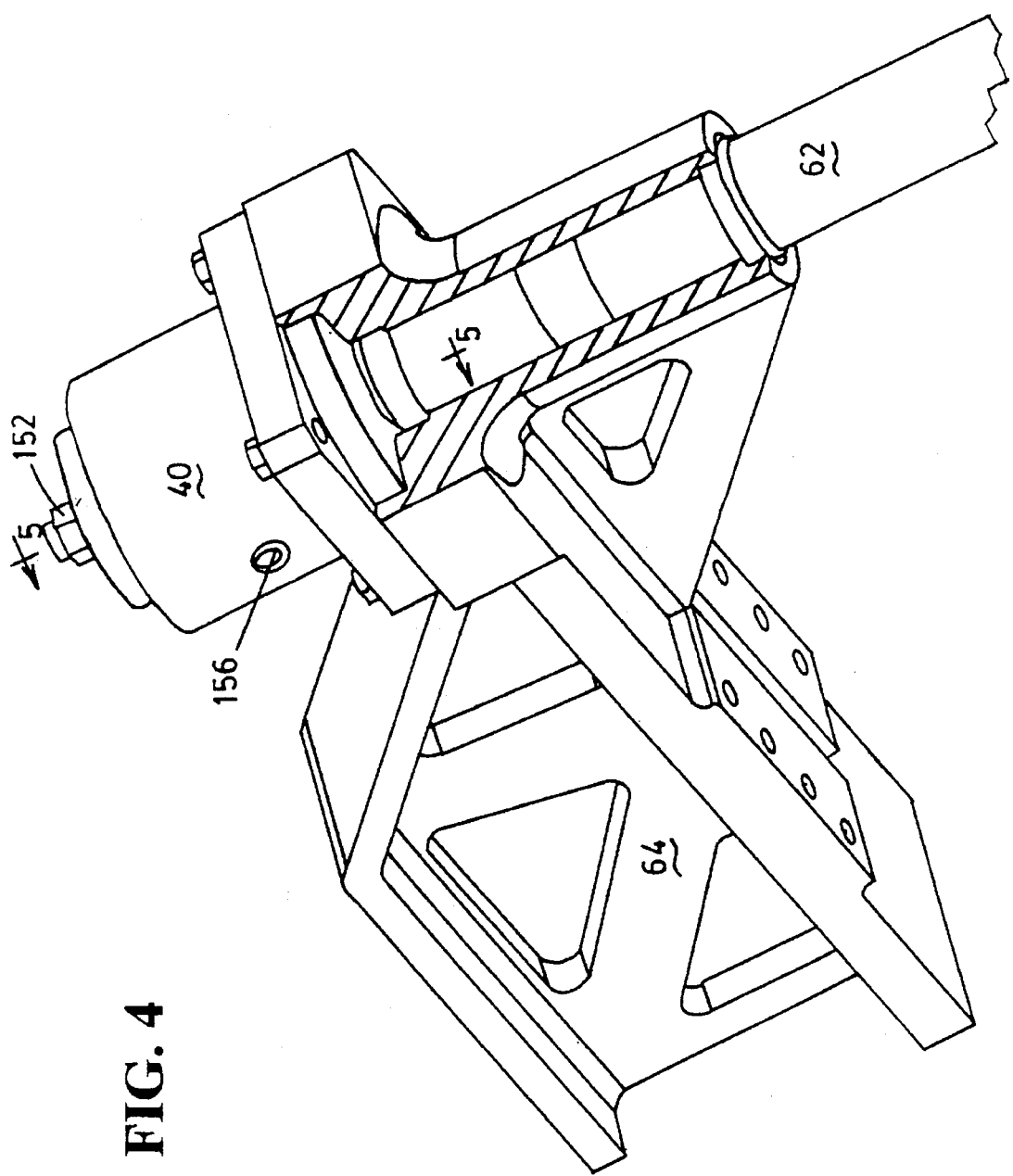
FIG. 4 is a fragmentary perspective detail view of the pull bar, pull rod, and pneumatic biasing element of the anvil drive assembly, with a portion broken away to reveal interior details of the biasing element.
Figure 5:
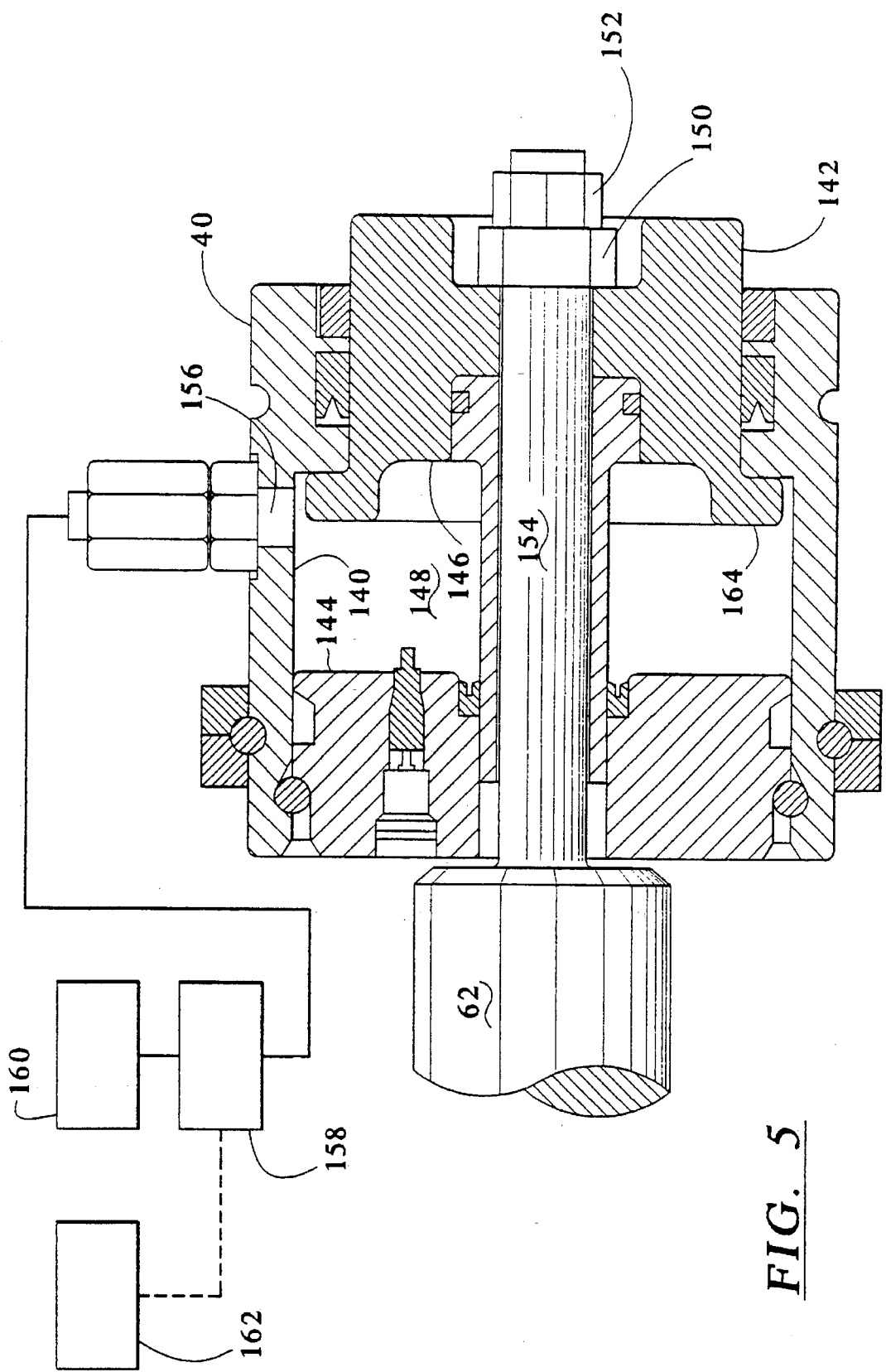
FIG. 5 is a partial section of the biasing element, taken along line 5—5 of FIG. 4.

In the present embodiment, the biasing elements 40 and 41 operatively connect the anvils such as 32 to their cam drive. Referring to FIGS. 4 and 5, the biasing elements 40 and 41 are identical pneumatic linkages. Springs or other resilient couplings could also be used, although pneumatic linkages have certain advantages which will be described below. For brevity, only the biasing element 40 will be described here.

The biasing element 40 comprises a bore 140 which receives a sliding piston 142. The annular cylinder and piston surfaces 144 and 146 and the bore 140 define a substantially closed space 148. The piston 142 is captured on the end of the pull rod 62 by nuts 150 and 152 threaded on the extension 154 of the pull rod 62. The bore 140 is formed in an integral part of the pull bar 64.

The space 148 is pressurized via a port 156 and a pressure regulator 158 with a source of pressurized gas 160. A remote control such as 162 can be used to change the pressure setpoint of the regulator 158, thus changing the pressure within the space 148. Gas pressure within the space 148 biases the piston surface 146 to the fight relative to the cylinder surface 144, so the piston floats above or ahead of the surface 144, thus biasing the pull rods 62 and the anvil bar 56 toward their respective closed positions.

The degree to which the piston 142 floats above the cylinder surface 144 can be controlled by capturing the piston 142. In the embodiment of FIG. 5, the flange 164 of the piston 142 captures the piston 142 within the cylinder bore 140.

When the pull bar 64 and the anvils such as 32 are at their closed positions, the carton closure being sealed is borne against by the anvils, holding the flange 164 off its stop. At this point, the gas cushion in the space 148 is the only force exerted by the anvil against the closure and the opposed sealing horn. This sealing force is the product of the gas pressure within the space 148 and the effective area of the surface 144. A specific force of about 15,000N is contemplated in this embodiment, though more or less pressure may be desirable in given situations.

One advantage of the illustrated arrangement is that the sealing force exerted by the anvils 32 is reproducible, despite minor differences in thickness or resilience of the fins such as 22 (due, for example, to the occasional capture of small amounts of product within the folds of the fin 22). Another advantage is that, being equal to the gas pressure within the space 148, the anvil pressure can be changed by changing the gas pressure. The gas pressure can readily be changed remotely.

Still another advantage of the present arrangement can be realized by allowing communication between the respective spaces 148 of two or more biasing elements such as 40 and 41. This allows reliably identical biasing pressures to be exerted at all times by two biasing elements connected to the same pull rods 62 or other machine elements. Such communication is schematically illustrated in FIG. 1.

ULTRASONIC CONVERTER SEAL

Figure 9:
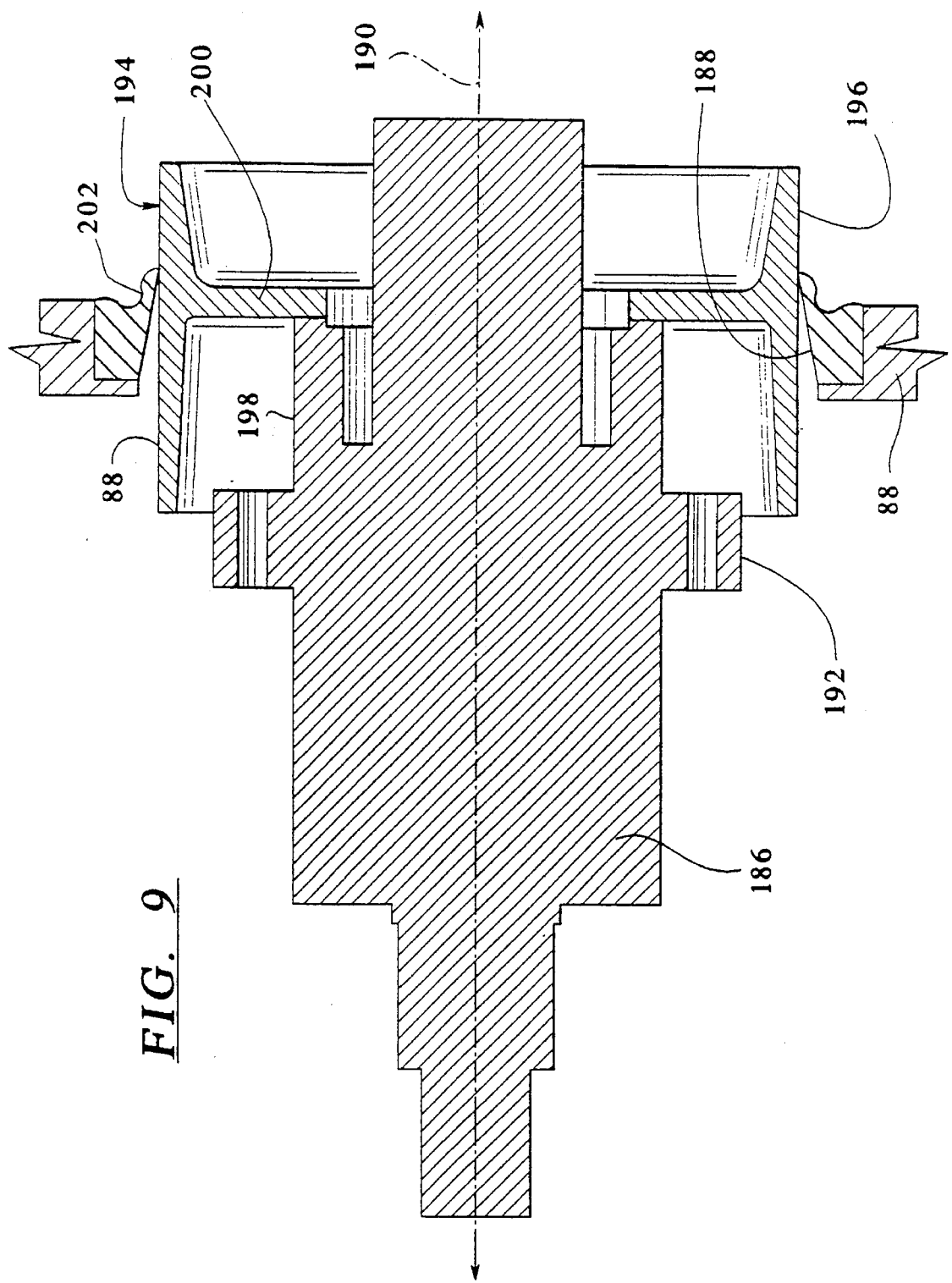
FIG. 9 is a section taken along line 9—9 of FIG. 1, showing how the hygienic and non-hygienic areas of the present machine are kept separate where the ultrasonic sealer penetrates the isolation wall.

Referring now to FIGS. 1 and 9, an arrangement is shown for sealing between the ultrasonically vibrating converter 186 and the isolation wall 88 which partitions the non-hygienic area (to the left of the wall 88 in FIG. 9) from the hygienic area (to the right of the wall 88 in FIG. 9). This area must be sealed because the converter 186, being attached to the sealing horn 112, also reciprocates between open and closed positions as the cradle 118 moves. It is important to keep foreign matter from being thrust either way through the isolation wall 88 by reciprocation and vibration of the converter 186.

The necessary barrier is obtained as illustrated in FIG. 9. The isolation wall 88 has an opening defined by a marginal edge 188. An ultrasonic converter 188 is disposed in the opening 188, and is reciprocated within the opening 188 along an axis 190 passing through the opening. The converter 188 is vibrated at an ultrasonic frequency by machinery disposed in the non-hygienic area.

The converter 186 has a null area or node 92 at which the converter is vibrated substantially minimally. (The ultrasonic waves are standing waves propagated along the axis 190, so the converter 186 has one or more nodes, each disposed substantially in a plane perpendicular to the axis 190, where the local amplitude of the vibrations is quite small relative to their maximum amplitude.)

A generally cylindrical sealing surface 194 defined by a sleeve 196 is fixed with respect to a first member which is one of the marginal edge and the null area. Here, the sleeve 196 is fixed to a forwardly projecting skirt 198 which depends from the null area 192. The skirt effectively projects the null area forward, which is important so that the converter does not transmit substantial ultrasonic energy to the sleeve 196, which could damage or melt the seal described below.

The sealing surface 194 faces a second member which is the other of the marginal edge and the null area (and here is the marginal edge 188 defining the opening in the wall 88).

The web 200 of the sleeve 196 is joined, as by welding, to the skirt 198. The web 200 defines a barrier between the sealing surface 194 and the null area 192, which keeps foreign matter from passing through the sleeve 196. The seal between the converter 186 and the opening 188 is completed by a wiping seal 202 mounted to the opening 188, which wipes the generally cylindrical sealing surface 194 as the converter 186 is reciprocated.

It will be appreciated that the parts of the assembly can be rearranged. For example, the seal 202 can be mounted to the null area 192 and the sleeve can be mounted to the opening 188 to obtain the same effect.

ANVIL ADJUSTMENT

Figure 10:
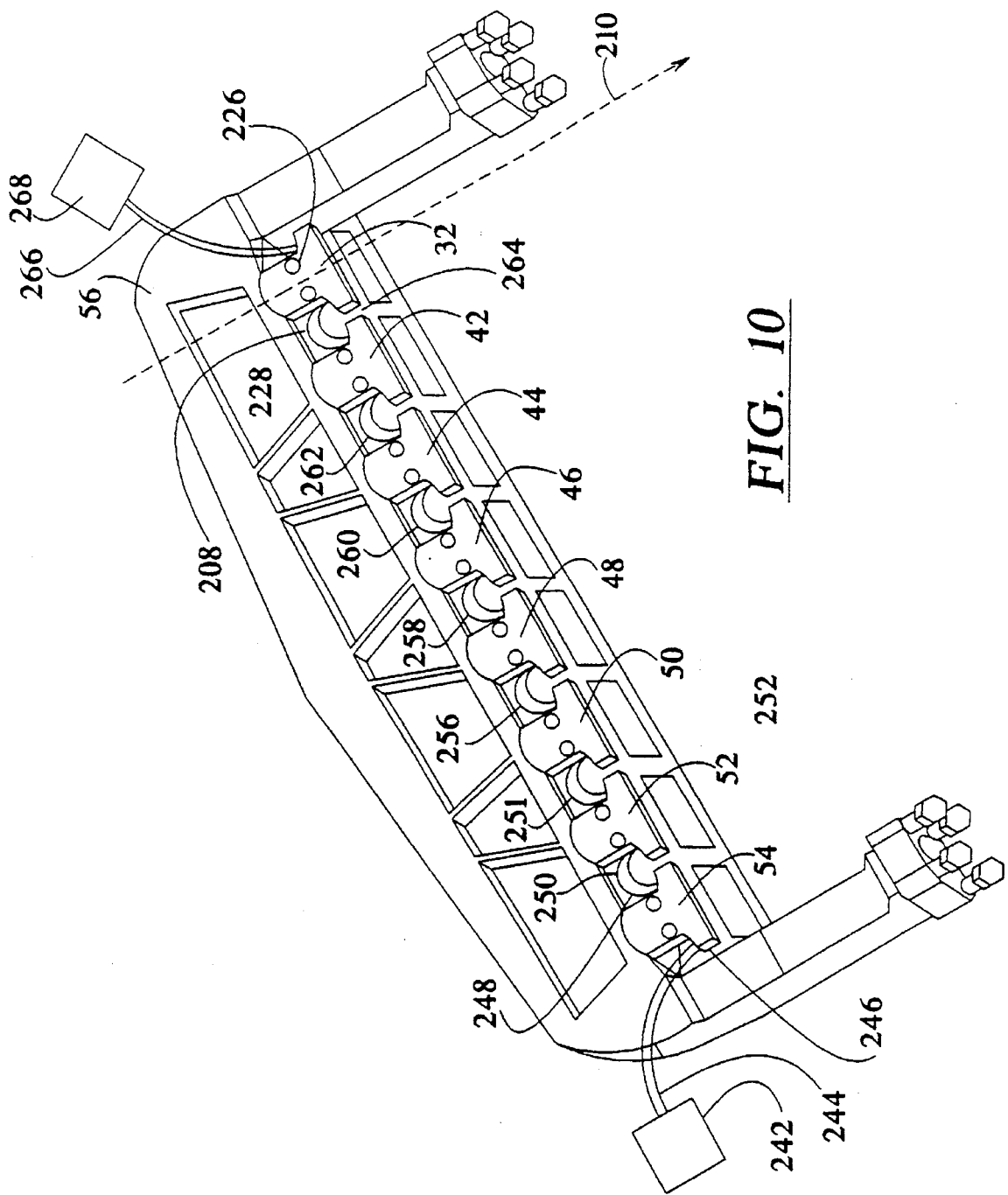
FIG. 10 is a more detailed perspective view, in isolation, of the anvil bar of FIG. 1.
Figure 11:
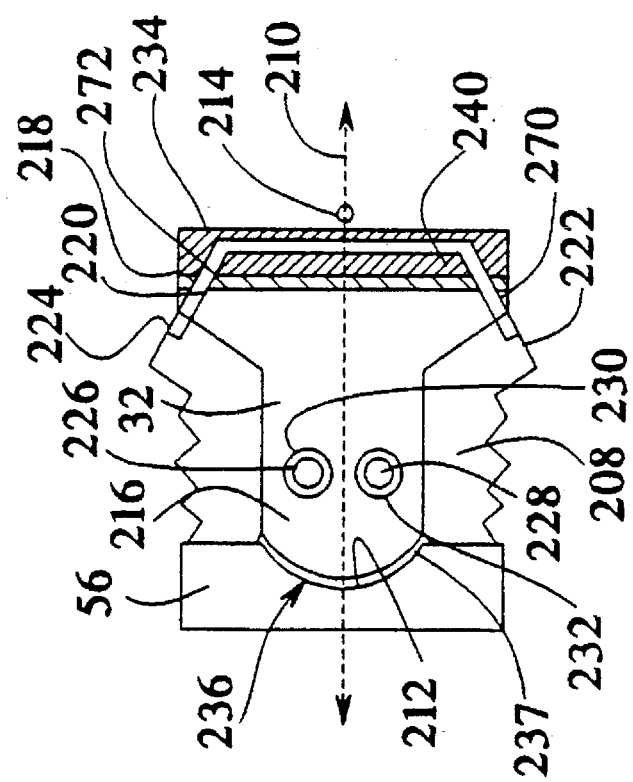
FIG. 11 is a section, taken parallel to one of its major side faces, of one of the anvils shown in FIG. 10.

FIGS. 1, 10, and 11 show certain advantageous details of the anvils 32 and 42–54 and their mounting on the anvil bar 56. Each anvil is connected identically, so only the anvil 32 and its mounting will be described.

The anvil 32 is received by a backing element—here, the anvil bar 56 extending substantially perpendicular to the axis 210—which is adapted to move generally along the axis 210 between an open and a closed position relative to the transducer or sealing horn 34 (shown in FIG. 7), as was previously described. The anvil bar has a flat mounting surface 208 to which the anvils such as 32 are bolted.

The anvil bar 56 has a cylindrically curved front surface 212 which is opposed to the corresponding transducer 34 and defines an arc of a circle having a center of curvature 214 and lying generally in a plane (here, the plane of the paper for FIG. 11) defined by the axis 210. This plane is chosen because there is a need to pivotally adjust the anvil 32 in that plane. The circle defining the adjusting plane can also lie in a plane which intersects the plane of the paper in FIG. 11, if adjustments in other planes are desired. Alternately, the curved surface 212 can be a spherically curved surface which would allow universal adjustment of the orientation of the anvil 32 about the center 214. The surface 212 is shown as a concave surface, but it could also be a convex surface.

Referring in particular to FIG. 11, the anvil assembly 32 includes an anvil pad 216, a facing member 218, a resilient pad 220, and tubing couplers 222 and 224, which are all joined together in a suitable manner. Fastening screws 226 and 228 are received in fastening holes 230 and 232 to normally clamp the anvil assembly 32 to the mounting surface 208.

Figure 7:
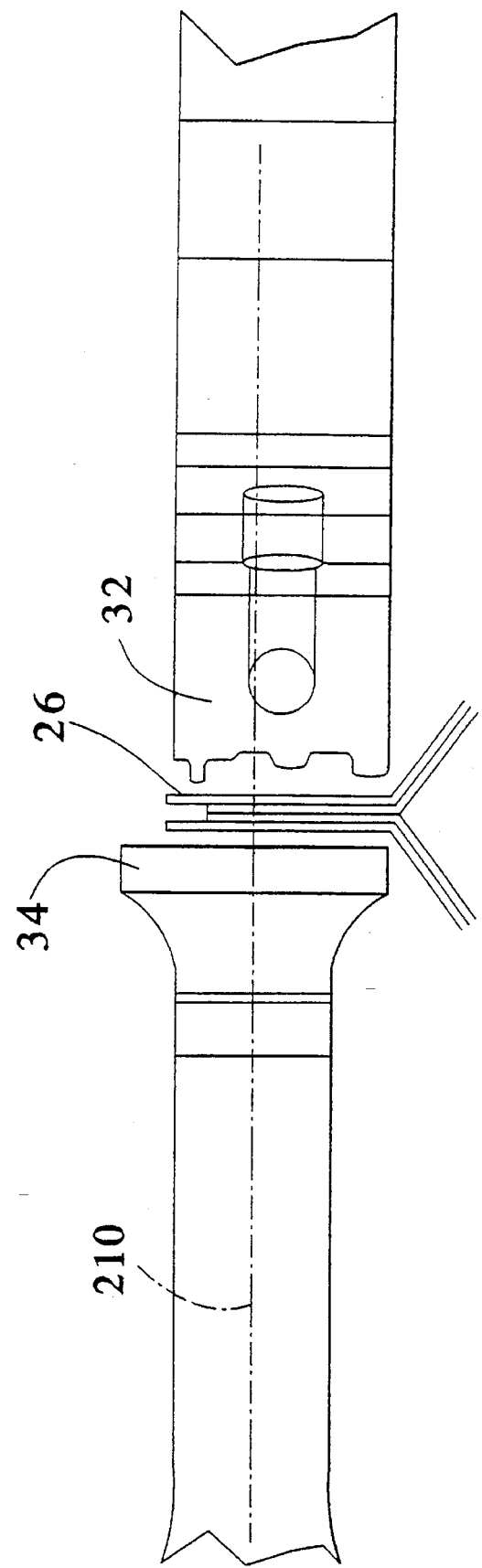
FIG. 7 is a view similar to FIG. 6, showing the anvil and sealing horn in their open positions with a gable closure located between them at a closure sealing position.

The anvil assembly 32 has a complexly shaped front surface 234, better shown in FIGS. 7 and 8, for contacting a workpiece and a curved back surface 236 which is substantially complementary to and normally bears against the curved front surface 212. As used in this description, a "complementary" pair of surfaces are a convex and concave surface which have substantially a common center of curvature and define circles lying in the same plane.

The fastening holes 230 and 232 are substantially larger than the shafts of the fastening screws 226 and 228 they receive, but smaller than the heads of the fastening screws 226 and 228. The heads alternatively can be smaller and washers can be inserted between the fastening screw heads and the portion of the anvil pad 216 against which the heads of the fastening screws 226 and 228 would otherwise directly bear. The substantially greater size of the fastening holes 230 and 232 relative to the fastening screws 226 and 228, best seen in FIG. 11, allows the anvil 32 to rock about the center 214 at least as much as one might wish to adjust the orientation of the anvil 32 relative to the anvil bar 56.

The fastening screws 226 and 228 are threaded into corresponding threaded holes in the mounting surface 208. Alternatively, the screws 226 and 228 could pass through larger holes in the mounting surface 208 and be threaded into correspondingly threaded holes in the anvil pad 216.

The fastening screws 226 and 228 have securing positions for fixing the anvil pad 216 and the anvil bar 56 together, which are reached by threading the screws 226 and 228 far enough into the mounting surface 208 to clamp the anvil pad 216 to the mounting surface 208. The fastening screws 226 and 228 have an adjusting position for allowing the anvil pad to rotate about the center 214 relative to the anvil bar 56 for aligning the anvil 32 with respect to the sealing horn 34 (FIG. 1). The adjusting position is reached by loosening the screws 226 and 228 sufficiently that the anvil pad 216 can rock with respect to the mounting surface 208. FIG. 10 illustrates that the anvils 32 and 42–54 are independently mounted to the mounting surface 208 as previously described, so they can independently rock about their respective centers of curvature, such as the center 214 for the anvil pad 216.

Figure 6:
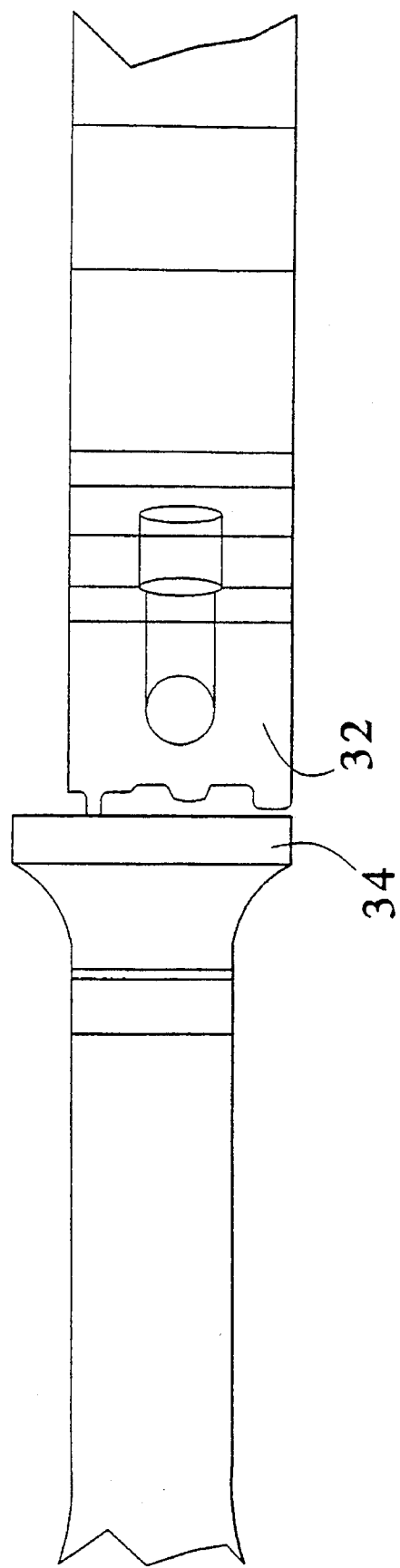
FIG. 6 is a schematic elevational view, taken from the perspective of section line 6—6 of FIG. 1, of one anvil and sealing horn abutting at a closure sealing position.

Referring now to FIGS. 6–8 and 11, the anvils such as 32 and transducers such as 34 of the ultrasonic sealing apparatus 20 can be aligned easily before beginning a production run. The fasteners such as 226 and 228 for all of the anvils 32 and 42–54 are first backed out to their adjusting positions. Next, if desired, the nominal contact positions of the anvils such as 32 and sealing horns such as 34 can be established by closing them together with light pressure so that they contact at the nominal closing position, as illustrated in FIG. 6. The contact between the sealing horns such as 34 and anvils such as 32 causes the anvils such as 32 to shift about their centers such as 214, thus orienting the anvils such as 32 into precisely parallel positions relative to the corresponding sealing horns such as 34. The fasteners can then be advanced to their securing positions to hold the adjustment. Once the nominal orientation of the anvils has been established, the anvils and transducers can be parted.

After, or instead of, performing the adjustment of the anvils such as 32 about their centers such as 214 with light closing pressure and without any cartons present, gauges representing workpieces to be clamped (which can simply be the top fins 26 or bottom fins 28 of cartons of the type which will next be run) can be inserted between each anvil such as 32 and transducer such as 34, as in FIG. 7. The fasteners such as 226 and 228 can be (or remain) backed out. The gauges 26 or 28 can be clamped between the anvils such as 32 and transducers or sealing horns such as 34 using the full sealing pressure which is intended to be exerted during the production run, as shown in FIG. 8. The dosing force will urge any of the anvil pads such as 216 which are out of alignment to realign themselves by shifting about their centers such as 214. The fasteners such as 226 and 228 can then be advanced to their securing positions to hold the adjustment. A shim 237 may be disposed between surfaces 212 and 236 to provide lateral adjustment.

ANVIL COOLING APPARATUS

The anvils receive some of the ultrasonic energy from the transducers or sealing horns when cartons are sealed. To prevent the anvils from heating excessively, the anvils can be cooled. To this end, cooling water can be directed through the anvils to cool them. Referring to FIGS. 10 and 11, each anvil such as 32 has an internal water passage 240 connecting its input and output nipples 222 and 224.

FIG. 10 illustrates that water is taken from a water supply 242, which can be a municipal water supply. The water optionally may be sanitized so it cannot contaminate the hygienic pan of the machine in the event of a leak. Water from the supply 242 is carded to the anvil 54 via a flexible tube 244. The tube 244 is sufficiently long and laid out in such a manner that reciprocation of the anvil bar 56 can be accommodated.

The tube 244 is fitted on the nipple 246 to pass cooling water into the internal passages of the anvil 54. The cooling water leaves the outlet nipple 248 of the anvil 54 via a bridge tube 250, which then directs the water to the inlet nipple 252 of the next anvil in line, here the anvil 52. A similar series of bridge tubes 254–264 transmits the cooling water through each of the anvils in turn.

Finally, an outlet tube 266 transfers the cooling water from the last anvil in line (32) to a drain 268. The outlet tube 266 is a flexible tube which is sufficiently long and laid out in such a manner that reciprocation of the anvil bar 56 can be accommodated. Of course, the drain 268 can be omitted and the water can be cooled and recycled to the source 242 if that is desired, and particularly if the water has been treated with relatively expensive sanitizing agents which are desirably recycled.

Several adaptations of the present cooling system are illustrated in FIG. 11. The resilient pad 220, typically made of rubber, ultrasonically and thermally isolates the anvil facing member 218 from the anvil pad 216. Because the facing member 218 is isolated, the cooling system can be limited to the facing member 218.

Also, to prevent the external tubing and fittings from being damaged or working loose, they are all mounted on the anvil pads 32 behind the resilient pad 220. The tubing and fittings themselves are therefore isolated from the ultrasonic energy. The internal water passage 240 itself has a portion 270 which passes through the resilient pad 220, directing water from an inlet nipple 222 behind the pad 220 to a cooling area in front of the pad 220. The internal water passage 240 has another portion 272 which passes through the resilient pad 220 and goes to the outlet nipple 224 behind the pad 220. The resilient pad 220 acts as a gasket between the pad 216 and facing member 218.

USE OF THE APPARATUS

The foregoing described apparatus can be used in a packaging machine such as the one disclosed in U.S. Pat. No. 5,488,812 which is hereby incorporated by reference. The apparatus can be driven using a servomotor and associated control system such as is illustrated in U.S. Ser. No. 08/315,414, entitled "Control System for a Packaging Machine", filed on even date herewith, which is likewise incorporated by reference.

Figure 15:
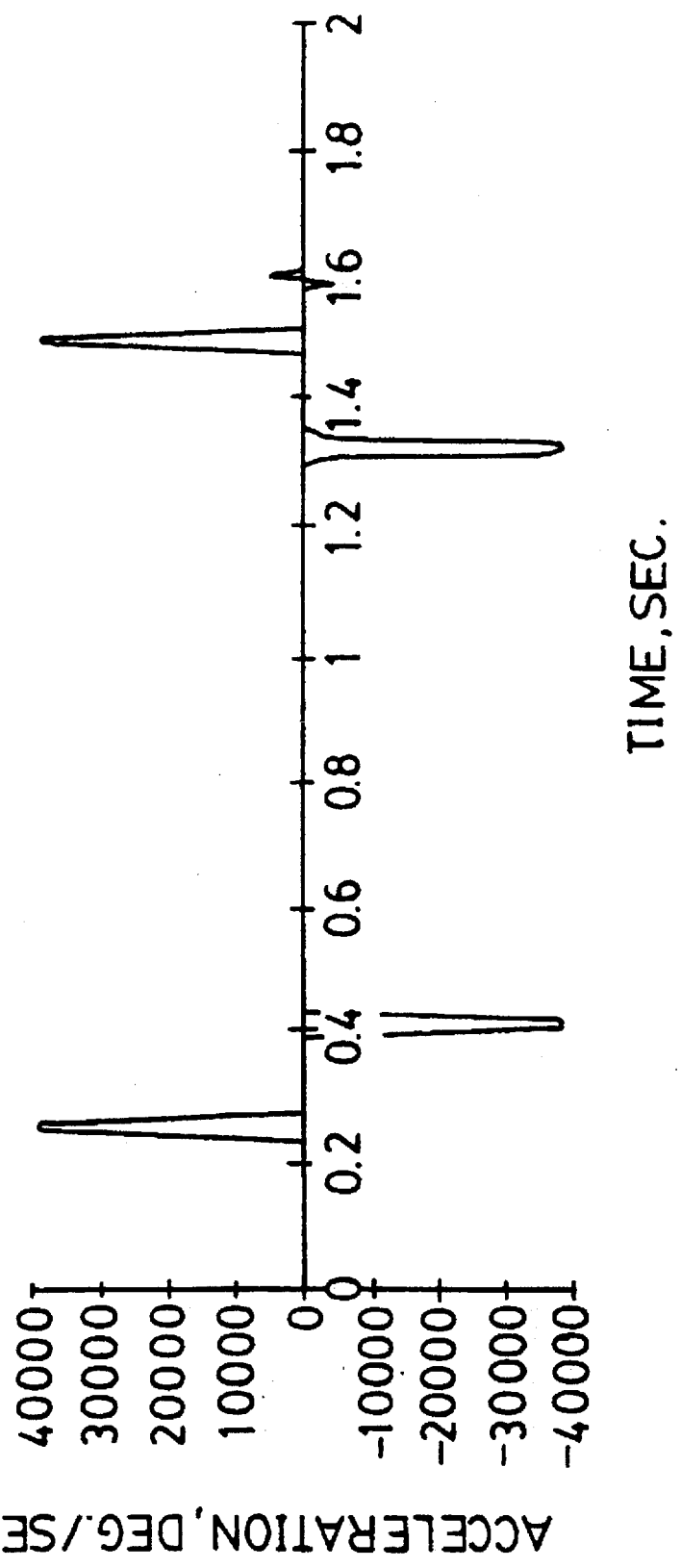
FIGS. 15–17 are similar to FIGS. 12–14, showing the acceleration, velocity, and position of the cam drive for sealing the bottom seal of a gable-bottom carton.
Figure 16:
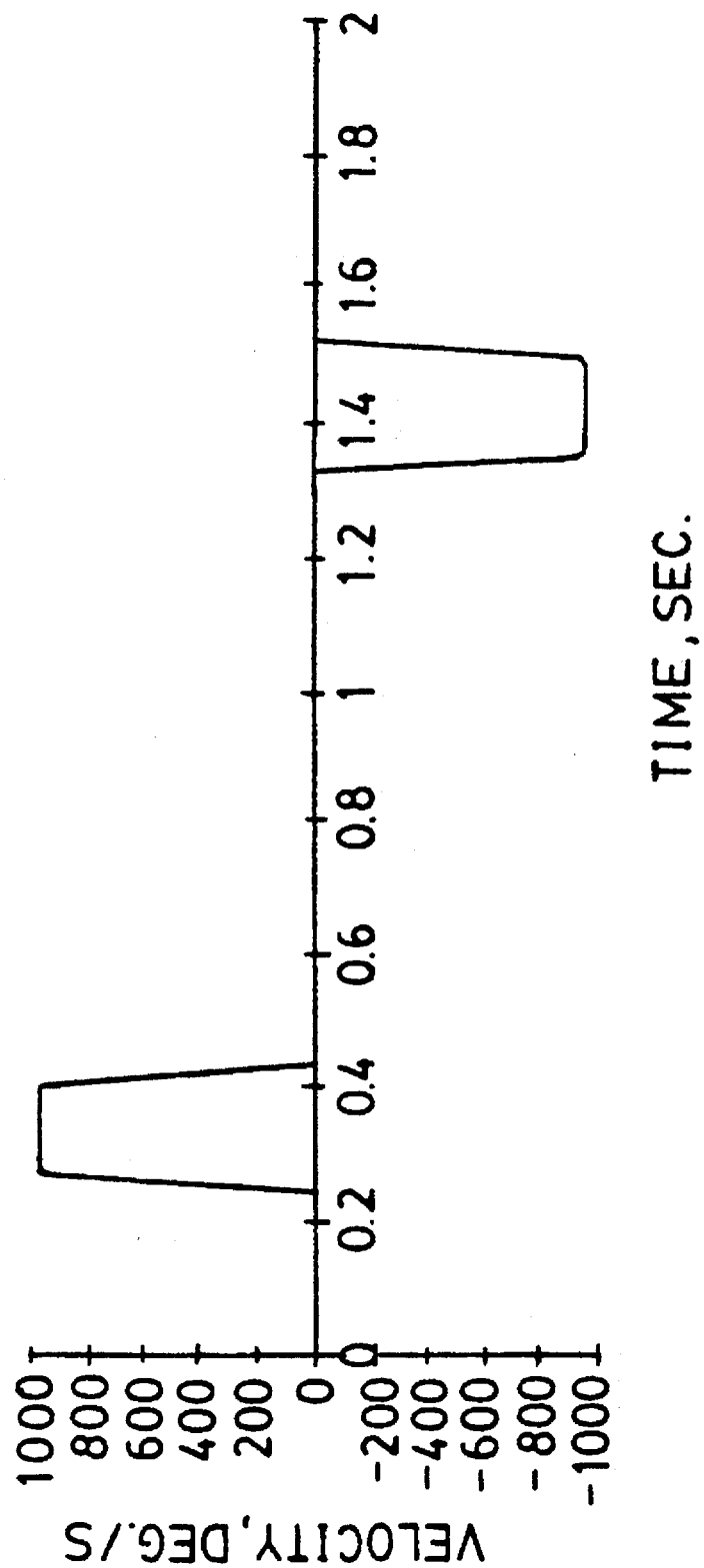
Figure 17:
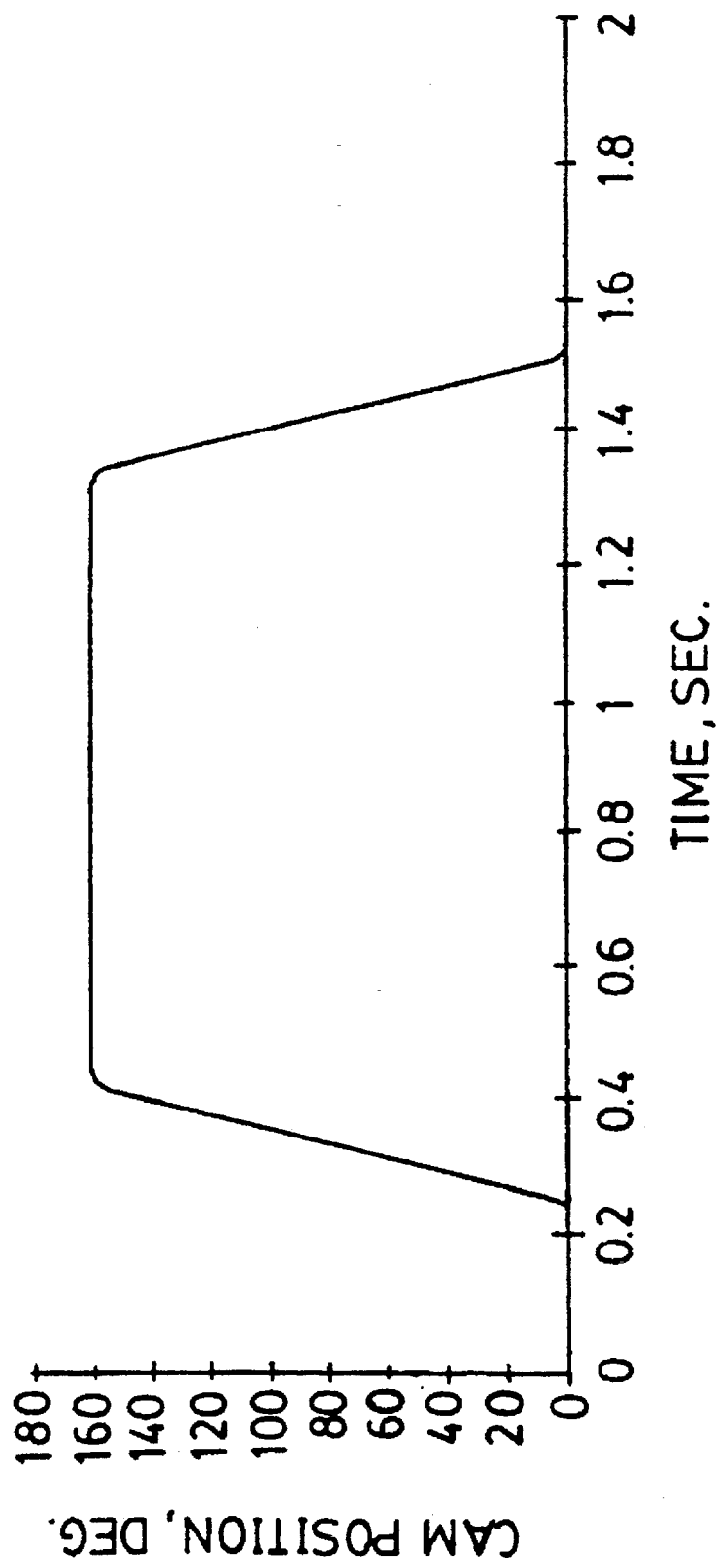

When the ultrasonic sealer is used to seal the bottom of a gable top carton in a packaging machine such as is disclosed in the '546 patent application, it can be controlled using the control system illustrated in U.S. Ser. No. 08/315,414 which may implement the motion profile illustrated in FIGS. 15–17 of this application. FIGS. 15–17 illustrate exemplary acceleration, velocity, and position profiles for a single sealing cycle.

The motion profile may include two moves. The first motor move, which occurs between 0.2 sec. and 0.6 sec. into the cycle, rotates the cams to close the sealing jaws. The first motor move begins with a lead time sufficient to ensure that jaws make contact with the carton bottoms just after the carton bottoms arrive in the plane of the jaws. The second motor move, which occurs between about 1.3 and about 1.6 sec. into the cycle, rotates the cams so that the sealing jaws open. For each move, 15% of the move time is spent accelerating, 70% of the move time is spent at constant velocity, and 15% of the move time is spent decelerating. The cams are shaped to move the jaws during the constant velocity portion of the move thus avoiding the possibility of adding the torque required to move the jaws to the torque required to accelerate the cams.

Each move of this profile is basically a 15%, 70%, 15% trapezoidal velocity profile. However, during the time of any acceleration (or deceleration) 20% of the acceleration time is spent ramping up to constant acceleration and 20% of the acceleration time is spent ramping down to zero acceleration. The ramping of accelerations assists in preventing jerking of the mechanism.

Figure 12:
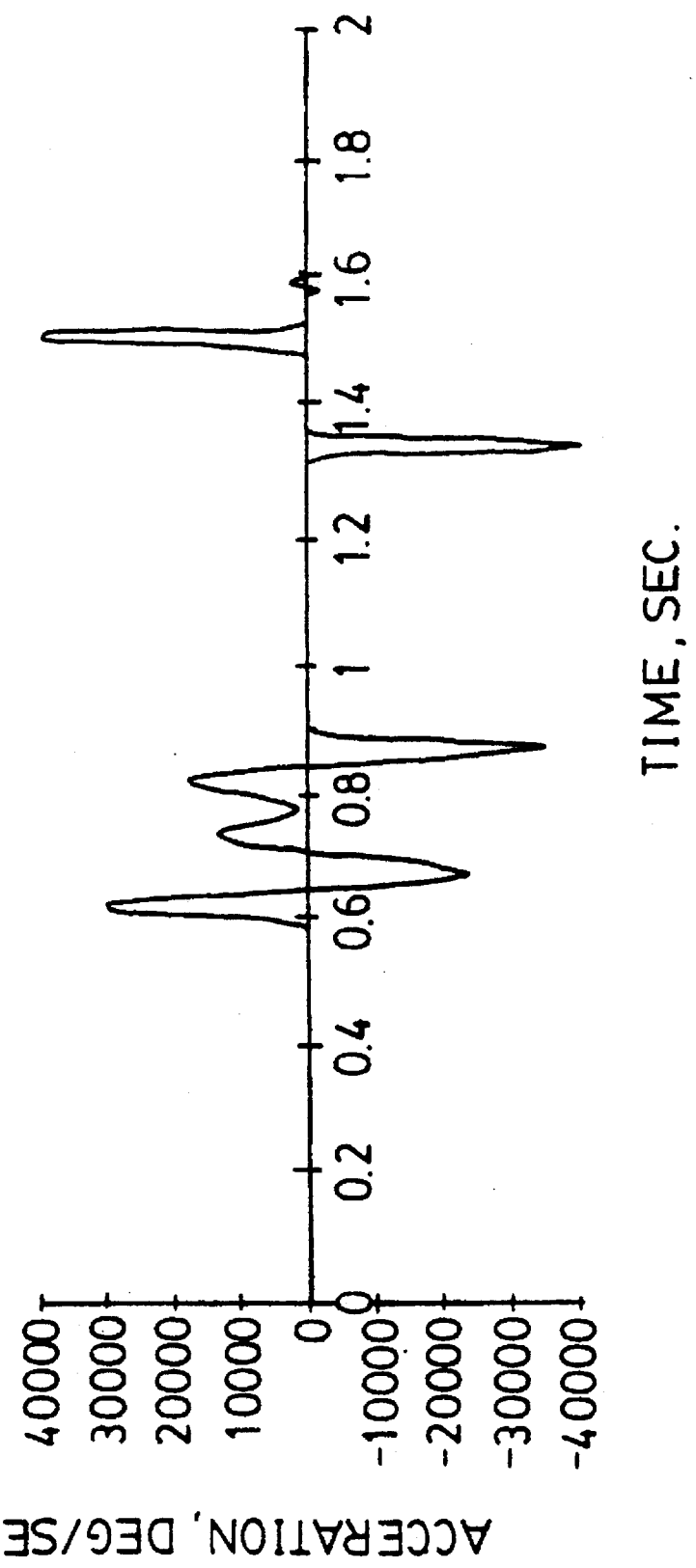
FIGS. 12, 13, and 14 respectively are plots of the acceleration, velocity, and position of the cam drive according to the embodiment of FIGS. 1–11, each versus time, for sealing the top seal of a gable top carton.
Figure 13:
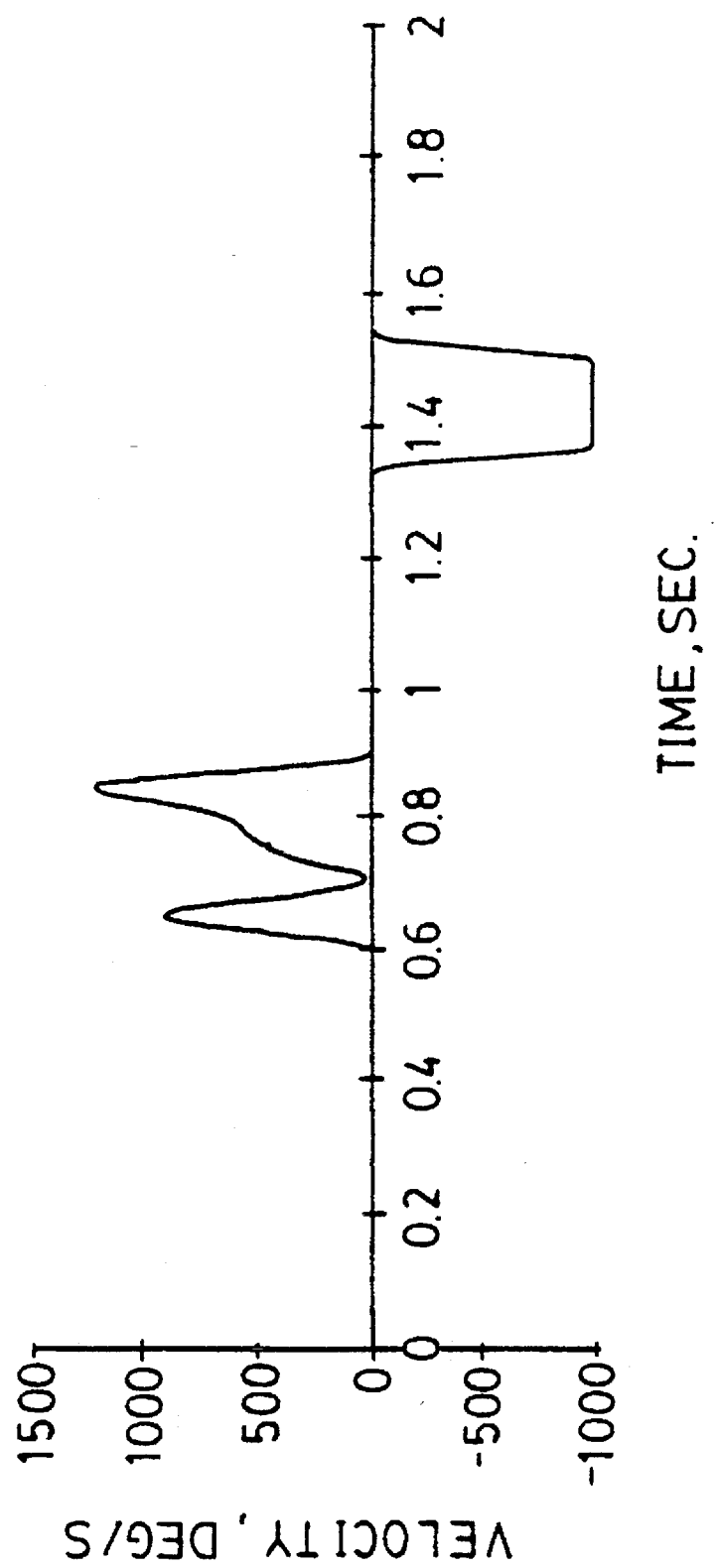
Figure 14:
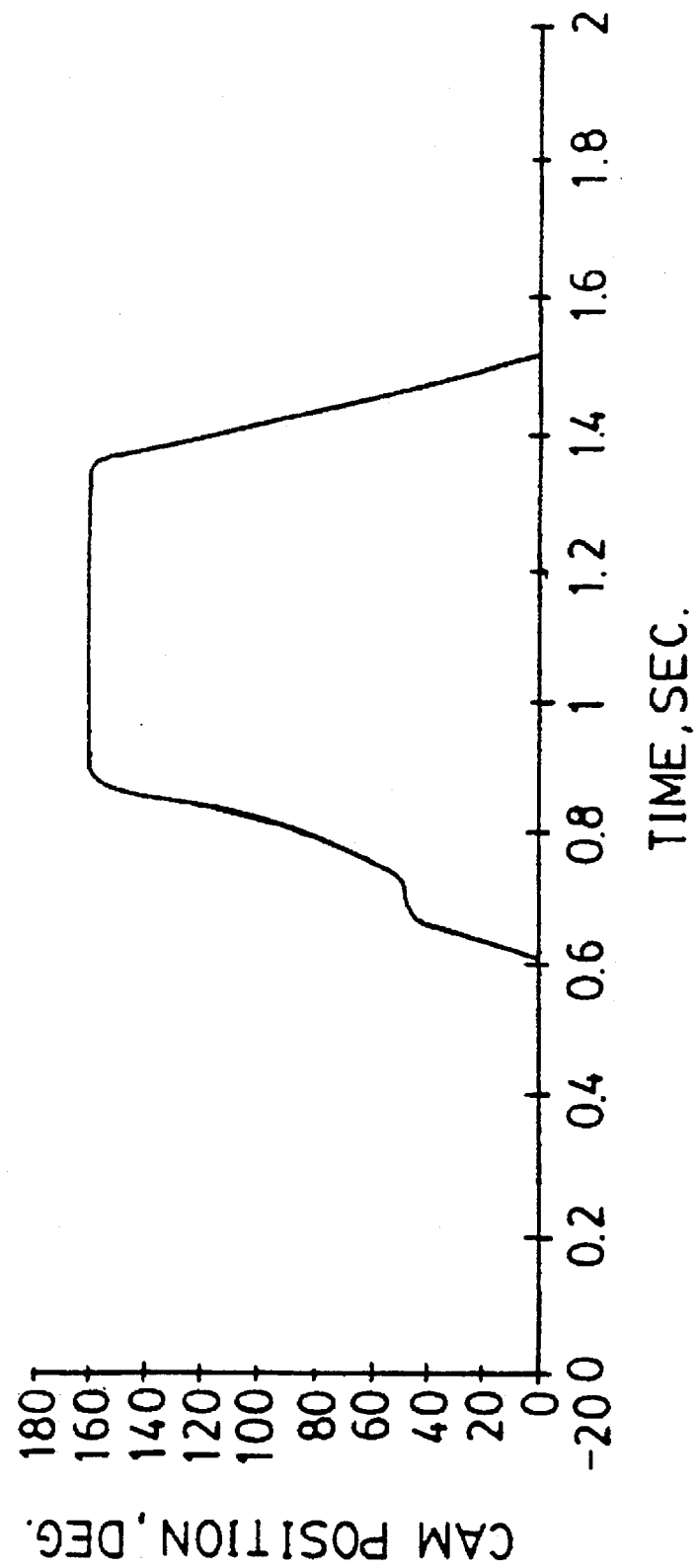

When the ultrasonic sealing press is used as a top sealer, it may be moved in accordance with the motion profiles illustrated in FIGS. 12–14. The motion may proceed in accordance with two moves.

The first move is an atypical move consisting of three polynomial splines. The first spline, which acts between about 0.6 and 0.7 sec. into the cycle, rotates the cams so that the jaws make contact with the top sealing areas of the carton generally simultaneously with the arrival of the cartons in the plane of the jaws. The cams arrive at that point with a very low velocity. The low cam velocity was desired so that the jaw velocities would be small enough to give refold mechanisms, such as those illustrated in U.S. Ser. No. 08/315,400, entitled "Apparatus for Sealing the Fin of a Gabled Carton", filed on even date herewith, time to shape the carton tops for proper folding and sealing. At the same time it is desirable to have some velocity greater than zero so that the subsequent acceleration could be done without having to overcome static friction.

The second spline of the move, which acts between about 0.7 sec. and 0.8 sec. into the cycle, rotates the cams until the jaws—and thus, the carton tops—are about 5 mm apart. It was desired that this move last 100 ms to continue giving time for action of the refold mechanisms and to allow excess air to escape the carton. It is also desired that the velocity at the end of the second spline be as low as possible while still enabling the jaws to finish closing in the next 100 ms via the third spline. The low velocity at the end of the second spline (and, thus, at the beginning of the third spline) is desirable to extend the time for air escapement to proceed as long into the third spline as possible.

The third spline, which acts between about 0.8 sec. and 0.9 sec. into the cycle, has to decelerate as fast as possible to complete the cam rotation and jaw closing in the allotted 100 ms.

The second move, which acts between about 1.3 sec. and 1.6 sec. into the cycle, opens the top sealer jaws and is the same as the move that opens the bottom sealer jaws. 15% of the move time is spent accelerating, 70% of the move time is spent at constant velocity, and 15% of the move time is spent decelerating. During the time of any acceleration (or deceleration) 20% of the time is spent ramping up to constant acceleration and 20% of the time is spent ramping down to zero acceleration. Again, the ramping of accelerations was implemented to reduce jerking of the mechanism.

The foregoing figures use units that are in deg, deg/s, and deg/s$^2$ of cam rotation instead of radius or degrees of motor rotation because motor rotation is directly proportional to cam rotation and because cam rotation is more meaningful to more people than motor rotation.

We claim as our invention:

1. A carton sealer for sealing a closure of a carton having first and second sides and disposed at a closure sealing position, said sealer comprising:

A. an anvil mounted on an anvil bar, the anvil bar fixed to a pull rod for reciprocal, linear travel with the pull rod between an open position allowing a carton to pass and a closed position for bearing against the first side of a closure located at the closure sealing position;

B. an anvil drive comprising a first cam surface mounted for rotation on a drive shaft and engaging a corresponding cam follower in fixed engagement with the anvil bar for linearly reciprocating said anvil bar and anvil between its open position and its closed position in a plane;

C. an ultrasonic sealing horn mounted to a cradle, the cradle slidably mounted for sliding movement along the pull rod for reciprocal, linear travel in the plane between an open position allowing a carton to pass and a closed position for bearing against the second side of a closure located at the closure sealing position;

D. a horn drive comprising a second cam surface mounted for rotation on the drive shaft and engaging a corresponding cam follower in fixed engagement with the cradle for linearly reciprocating said horn and cradle between its open position and its closed position;

E. whereby a rotation of the drive shaft resulting in corresponding rotation of the cam surfaces to thereby concurrently drive the ultrasonic sealing horn and the anvil linearly toward one another to the closed positions.

2. The carton sealer of claim 1, further comprising at least two anvils mounted on the anvil bar and at least one corresponding ultrasonic horn mounted on the cradle.

3. The carton sealer of claim 1 wherein the first and second cam surfaces are disposed on a single cam element.

4. The carton sealer of claim 1 and further comprising a wall wherein said anvil drive and said horn drive are located on the same side of said wall and wherein said sealing horn and said anvil are disposed in sealing area, the sealing area being disposed on a side of the wall opposite said anvil drive and said horn drive.

5. The carton sealer of claim 1 and further comprising a biasing element operatively connecting one of said anvil and said horn and its drive for limiting the sealing pressure developed between said anvil and said horn to a predetermined maximum value exerted by said biasing element.

6. The carton sealer of claim 5, wherein said biasing element comprises a pneumatic linkage, arranged so that the gas pressure in said pneumatic linkage biases one of said anvil and said horn toward its closed position.

7. The carton sealer of claim 6, further comprising a pressure regulator for regulating the gas pressure in said pneumatic linkage, thereby regulating the sealing pressure exerted through said pneumatic linkage accordingly.

8. The carton sealer of claim 7, wherein said pressure regulator is adjustable, thereby permitting the sealing pressure exerted through said pneumatic linkage to be adjusted.

9. The carton sealer of claim 2, further comprising at least two biasing elements operatively connecting the same one of said anvil bar and said cradle and its drive for limiting the sealing pressure developed between said anvil and said horn to a predetermined maximum value exerted by said biasing elements.

10. The carton sealer of claim 9, wherein said biasing elements comprise pneumatic linkages, arranged so that the gas pressure in said pneumatic linkages biases one of said anvil and said horn toward its closed position.

11. The carton sealer of claim 10, further comprising a pressure regulator for regulating the gas pressure in said pneumatic linkages, thereby regulating the sealing pressure exerted through said pneumatic linkages accordingly.

12. The carton sealer of claim 11, wherein the gas in said pneumatic linkages communicates, thereby maintaining equal gas pressure in each linkage.

13. The carton sealer of claim 3, wherein said cam comprises a pivot defined by said drive shaft, the cam being rotated by said drive shaft about said pivot.

14. The carton sealer of claim 3, wherein said single cam element further comprises a third cam surface for driving said anvil toward its open position and a fourth cam surface for driving said horn toward its open position.

15. The carton sealer of claim 13, wherein said first cam surface and said second cam surface are substantially opposed with respect to said pivot.

16. The carton sealer of claim 13, and further comprising a servomotor control system connected to drive the drive shaft and wherein said servomotor control system rotates said drive shaft according to a stored motion profile.

17. The carton sealer of claim 13, wherein said cam is reciprocally rotated through an arc about said pivot.

18. The carton sealer of claim 5 wherein the biasing element comprises a pneumatic cylinder disposed at an end of the pull rod and countering the force of the pull rod as the pull rod and anvil move to the closed position.

19. A carton sealer for sealing a closure of a carton having first and second sides and disposed at a closure sealing position, said sealer comprising:

an anvil bar;

a plurality of anvils mounted to the anvil bar;

first and second pull rods fixed for co-movement with the anvil bar at opposite sides of the anvil bar;

a cradle having opposite sides thereof slidably engaging the first and second pull rods;

a plurality of ultrasonic sealing horns mounted to the cradle;

a drive shaft;

first and second cam surfaces mounted for co-rotation with and proximate a first end of the drive shaft, the first cam surface engaging a corresponding cam follower in fixed engagement with the first and second pull rods for linearly driving said pull rods, said anvil bar, and said anvils to a closed position for bearing against the first side of a closure located at the closure sealing position, the second cam surface engaging a further corresponding cam follower in fixed engagement with the first and second pull rods for linearly driving said pull rods, said anvil bar, and said anvils to an open position allowing a carton to pass through the closure sealing position;

third and fourth cam surfaces mounted for co-rotation with and proximate a second end of the drive shaft, the third cam surface engaging a corresponding cam follower in fixed engagement with the first and second pull rods for linearly driving said pull rods said anvil bar, and said anvils to the closed position, the fourth cam surface engaging a further corresponding cam follower in fixed engagement with the first and second pull rods for linearly driving said pull rods, said anvil bar; and said anvils to the open position;

fifth and sixth cam surfaces mounted for co-rotation with and proximate the first end of the drive shaft, the fifth cam surface engaging a corresponding cam follower in fixed engagement with the cradle for linearly driving said cradle and said ultrasonic sealing horns to a closed position for bearing against the second side of a closure located at the closure sealing position, the sixth cam surface engaging a further corresponding cam follower in fixed engagement with the cradle for linearly driving said cradle and said ultrasonic sealing horns to an open position allowing a carton to pass through the closure sealing position:

seventh and eighth cam surfaces mounted for co-rotation with and proximate the second end of the drive shaft, the seventh cam surface engaging a corresponding cam follower in fixed engagement with the cradle for linearly driving said cradle and said ultrasonic sealing horns to the closed position, the eighth cam surface engaging a further corresponding cam follower in fixed engagement with the cradle for linearly driving said cradle and said ultrasonic sealing horns to the open position.

20. The carton sealer of claim 19 wherein said first and second cam surfaces am disposed on a single cam element.

21. The carton sealer of claim 19 wherein said fourth and fifth cam surfaces are disposed on a single cam element.

22. The carton sealer of claim 19 wherein the first, second, fifth, and sixth cam surfaces are disposed on a single cam element.

23. The carton sealer of claim 19 wherein the third, fourth seventh, and eighth cam surfaces are disposed on a single cam element.

24. The carton sealer of claim 19 and further comprising a biasing element operatively connected to one of said anvils and said horns for limiting sealing pressure developed between said anvils and said horns to a predetermined maximum value exerted by said biasing element.

25. The carton sealer of claim 19 and further comprising a first biasing element operatively connected to the first pull rod and a second biasing element operatively connected to the second pull rod for limiting sealing pressure applied to the closure by the horns and anvils toe predetermined maximum sealing pressure.

26. The carton sealer of claim 19, and further comprising a servomotor control system connected to drive the drive shaft, said servomotor control system rotating said drive shaft according to a stored motion profile.

27. The carton sealer of claim 20 wherein said third and fourth cam surfaces are disposed on a single element.

28. The carton sealer of claim 21 wherein said sixth and seventh cam surfaces are disposed on a single cam element.

29. The carton sealer of claim 22 wherein the third, fourth, seventh, and eighth cam surfaces are disposed on a single cam element.

30. The carton sealer of claim 24, wherein said biasing element comprises a pneumatic linkage arranged so that the gas pressure in said pneumatic linkage biases one of said anvils and said horns toward their closed position.

31. The carton sealer of claim 30, further comprising a pressure regulator for regulating the gas pressure in said pneumatic linkage, thereby regulating the sealing pressure exerted through said pneumatic linkage accordingly.

32. The carton sealer of claim 31, wherein said pressure regulator is adjustable, thereby permitting the sealing pressure extended through said pneumatic linkage to be adjusted.

33. The carton sealer of claim 25 wherein the first and second biasing elements are pneumatic cylinders.

34. The carton sealer of claim 33 wherein the pneumatic cylinders are connected to one another by a passage to thereby equalize pressure applied by the pneumatic cylinders.

* * * * *

UNITED STATES PATENT AND TRADEMARK OFFICE
CERTIFICATE OF CORRECTION

PATENT NO. : 5,605,026
ISSUED : February 25, 1997
INVENTOR(S) : Erik Schött, et al.

It is certified that errors appear in the above-identified patent and that said Letters Patent is hereby corrected as shown below:

IN COLUMN 3, LINE 6

Cancel "dement" and insert --element-- therefor.

IN COLUMN 3, LINE 12

Cancel "requiting" and insert --requiring-- therefor.

IN COLUMN 3, LINE 37

Cancel "Open" and insert --open-- therefor.

IN COLUMN 5, LINE 55

Cancel "tings" and insert --rings-- therefor.

IN COLUMN 6, LINE 13

Cancel "154" and insert --64-- therefor.

UNITED STATES PATENT AND TRADEMARK OFFICE
CERTIFICATE OF CORRECTION

PATENT NO. : 5,605,026
ISSUED : February 25, 1997
INVENTOR(S) : Erik Schött, et al.

It is certified that errors appear in the above-identified patent and that said Letters Patent is hereby corrected as shown below:

IN COLUMN 11, LINE 34

Cancel "dosing" and insert --closing-- therefor.

IN COLUMN 11, LINE 55

Cancel "carded" and insert --carried-- therefor.

IN COLUMN 15, LINE 41

After the second "rods" insert --,--

IN COLUMN 15, LINE 46

Cancel "bar;" and insert --bar,-- therefor.

IN COLUMN 16, LINE 10

Cancel "am" and insert --are-- therefor.

IN COLUMN 16, LINE 28

Cancel "toe" and insert --to a-- therefor.

IN COLUMN 16, LINE 35

After "single" insert --cam--

IN COLUMN 16, LINE 51

Cancel "extended" and insert --exerted-- therefor.

UNITED STATES PATENT AND TRADEMARK OFFICE
CERTIFICATE OF CORRECTION

PATENT NO. : 5,605,026
DATED : February 25, 1997
INVENTOR(S) : Erik Schott, et al.

It is certified that error appears in the above-indentified patent and that said Letters Patent is hereby corrected as shown below:

IN COLUMN 6, LINE 19

Cancel "154" and insert --64-- therefor.

IN COLUMN 7, LINE 7

Cancel "dosed" and insert --closed-- therefor.

IN COLUMN 8, LINE 42

Cancel "fight" and insert --right-- therefor.

Signed and Sealed this

Eighth Day of July, 1997

*Attest:*

BRUCE LEHMAN

*Attesting Officer*  *Commissioner of Patents and Trademarks*